(12) United States Patent
Fukuda

(10) Patent No.: US 7,619,788 B2
(45) Date of Patent: Nov. 17, 2009

(54) DOCUMENT FEEDING AND READING UNIT AND IMAGE FORMING APPARATUS

(75) Inventor: Minoru Fukuda, Kawasaki (JP)

(73) Assignee: Ricoh Co., Ltd., Tokyo (JP)

( * ) Notice: Subject to any disclaimer, the term of this patent is extended or adjusted under 35 U.S.C. 154(b) by 557 days.

(21) Appl. No.: 11/058,170

(22) Filed: Feb. 16, 2005

(65) Prior Publication Data

US 2005/0200919 A1 Sep. 15, 2005

(30) Foreign Application Priority Data

Feb. 16, 2004 (JP) ............................. 2004-038011
Oct. 26, 2004 (JP) ............................. 2004-310971

(51) Int. Cl.
*H04N 1/04* (2006.01)
(52) U.S. Cl. ...................... 358/496; 358/498; 358/412; 358/1.15; 358/404; 358/474; 399/44; 399/208
(58) Field of Classification Search ............... 358/1.15, 358/404, 474, 475, 487, 496, 498; 382/151; 399/69, 44, 208; 174/68.1
See application file for complete search history.

(56) References Cited

U.S. PATENT DOCUMENTS

| | | | | |
|---|---|---|---|---|
| 5,473,445 A * | 12/1995 | Takei et al. | ................... | 358/474 |
| 6,012,809 A * | 1/2000 | Ikeda et al. | ................... | 347/101 |
| 6,542,703 B1 * | 4/2003 | Jung | ........................... | 399/44 |
| 6,583,896 B1 * | 6/2003 | Suzuki et al. | ............... | 358/487 |
| 6,718,146 B2 * | 4/2004 | Nakamori | ..................... | 399/22 |
| 6,788,436 B1 * | 9/2004 | Yoshida et al. | .............. | 358/475 |
| 6,882,809 B2 * | 4/2005 | Hirose et al. | ................... | 399/92 |
| 6,909,048 B2 * | 6/2005 | Yamanaka et al. | ......... | 174/68.1 |
| 6,961,142 B2 * | 11/2005 | Miyajima | ................... | 358/1.15 |

(Continued)

FOREIGN PATENT DOCUMENTS

| | | | |
|---|---|---|---|
| EP | 502749 A2 * | 9/1992 | |
| EP | 612988 A2 * | 8/1994 | |
| JP | 57-211167 | 12/1982 | |
| JP | HEI 4-236565 | 8/1992 | |

OTHER PUBLICATIONS

E.E. "Andy" Anderson, Weng-Lyang Wang, A novel contact image sensor (CIS) module for compact and lightweight full page scanner applications, 1993, SPIE, vol. 1901, 173-181.*

(Continued)

*Primary Examiner*—Twyler L Haskins
*Assistant Examiner*—Miya J Cato
(74) *Attorney, Agent, or Firm*—Oblon, Spivak, McClelland, Maier & Neustadt, L.L.P.

(57) ABSTRACT

A document feeding and reading unit and an image forming apparatus capable of reducing errors in magnification copying when the change in the diameter of drive motors results from heating. The document feeding and reading unit reads a document image while transporting a document sheet. At least one transport mechanism, including at least one drive roller and driven roller brought into slidable contact with a drive roller, transports the document sheet while holding the document between the drive roller and the driven roller. A detector measures the temperature at a location of the document feeding and reading unit. A controller controls the rotation speed of the drive roller based on temperature information acquired by the temperature detector. The document feeding and reading unit can be suitably incorporated into an image forming apparatus.

18 Claims, 5 Drawing Sheets

U.S. PATENT DOCUMENTS

| | | |
|---|---|---|
| 7,020,411 B2 * | 3/2006 | Awaya ......................... 399/92 |
| 7,062,187 B2 * | 6/2006 | Peng et al. .................... 399/69 |
| 7,130,091 B2 * | 10/2006 | Ishimaru et al. ............. 358/496 |
| 2002/0015189 A1 * | 2/2002 | Miyajima ................... 358/404 |
| 2002/0149805 A1 * | 10/2002 | Tanaka et al. ............... 358/498 |
| 2004/0170314 A1 * | 9/2004 | Harris et al. ................ 382/151 |
| 2005/0158096 A1 * | 7/2005 | Park et al. ................... 399/405 |

OTHER PUBLICATIONS

El-Sharkawy, Sotiriadis, Bottomley, Atalar, Absolute Temperature Monitoring using RF Radiometry in the MRI Scanner, 2005, IEEE, 1-10.*

* cited by examiner

| MEASURED TEMPERATURE | NUMBER OF MOTOR ROTATION (PPS) |
|---|---|
| 87.5°C | 3995 |
| 75.0°C | 3996 |
| 62.5°C | 3997 |
| 50.0°C | 3998 |
| 37.5°C | 3999 |
| 25.0°C | 4000 |
| 12.5°C | 4001 |

DOCUMENT FEEDING AND READING UNIT AND IMAGE FORMING APPARATUS

CROSS REFERENCE TO RELATED APPLICATIONS

This patent document claims priority to Japanese applications No. 2004-38011 and 2004-310971, filed with the Japanese Patent Office on Feb. 16, 2004 and Oct. 26, 2004, respectively, the entire disclosure of each of which is hereby incorporated by reference herein in its entirety.

BACKGROUND OF THE INVENTION

1. Field of the Invention

The invention relates generally to image forming apparatuses, and more specifically to a document feeding and reading unit and an image forming apparatus capable of reducing errors in magnification copying when a change in the diameter of drive motors results from heating.

2. Discussion of the Background

In increasingly versatile image processing machines such as duplication apparatuses and other similar apparatuses, several improvements have been made on image qualities. For example, it is of great importance to improve the accuracy in document reading during an image reproduction process.

Among various units incorporated into a variety of image processing machines, such as image forming apparatuses, facsimile apparatuses, and multi-functional image processing machines having copy and facsimile capabilities, a document feeding and reading unit is included as a requisite part.

Since the document feeding and reading unit in an image forming apparatus is generally located in the upper portion of the apparatus for the sake of the copying operation, the unit is likely to be heated through copy operations by a fixing unit and copy sheets transported in the apparatus.

When the document feeding and reading unit is heated, several problems have arisen in the structure of previous feeding and reading units. For example, when the materials for forming rollers in use for feeding a document sheet have relatively large linear thermal expansion coefficients, and the rollers are thereby affected by appreciable thermal expansion, the change in roller diameter by heating may result in a non-reproducible document holding position depending on changing temperatures. As a result, the document position may be irregular with time and not reproducible for different iterations in the document feeding and reading unit, thereby worsening the accuracy in document reading.

For rollers formed of rubber materials, in particular, their linear thermal expansion coefficients are generally in the range of $(1\sim4)\times10^{-4}/°$ C., which is larger than those for metals by approximately one order of magnitude. Therefore, worsening in the accuracy of document reading is likely to arise in a document feeding and reading unit using rubber rollers for document feeding.

This difficulty may seemingly be avoided by providing a temperature sensor as disclosed in Japanese Laid-Open Patent Application No. 57-211167. That is, in a document feeding and reading unit configured to feed a document sheet automatically from a document supply unit onto a document platen and to discharge the document sheet also automatically upon completing the document reading, the document holding position on the platen is controlled by measuring the temperature with a temperature sensor disposed at a document supply unit and by controlling the number of drive pulses applied to a document transport roller depending on the temperature measured.

SUMMARY OF THE INVENTION

In the abovementioned document feeding and reading unit, however, the present inventors recognized that the speed of document transport cannot be controlled precisely even though the number of pulses is regulated. This may cause difficulties of errors in variable-magnification copying, which may result from any mismatch in transport speed between the document and copy sheet.

It was thus recognized by the present inventors that it may be desirable, therefore, to provide a document feeding and reading unit and an image forming apparatus incorporating the unit capable of reducing errors in the magnification copying even when the change in the diameter of drive motors results from heating.

Accordingly, it is an object of the present invention to provide a novel document feeding and reading unit and a novel image forming apparatus incorporating the unit having most, if not all, of the advantages and features of similarly employed units and apparatuses, while reducing or eliminating many of the aforementioned disadvantages.

The above and other object of the present invention are achieved by providing a novel document feeding and reading unit with a mechanism for reading a document image while transporting a document sheet, at least one transport mechanism including at least one drive roller and driven roller brought into slidable contact with the drive roller for transporting the document sheet while holding the document between the drive roller and the driven roller, a detector for measuring the temperature at an arbitrary location of the document feeding and reading unit, and a control for controlling the rotation speed of the drive roller based on temperature information acquired by the temperature detector.

In addition, the detector can be disposed in the vicinity of a drive roller included in a transport mechanism closest to a heat source among the at least one transport mechanism.

The detector can be formed including a temperature sensor of the contact type, such as a thermocouple coated with fluorocarbon resin. Alternatively, the temperature sensor may be of the non-contact type.

In another possible feature of the invention, the reading unit can include a plurality of contact line image sensors disposed in zigzag fashion, each being separated from neighboring contact line image sensors such that long sides of the plurality of contact line image sensors are each aligned in the horizontal scanning direction and that portions of the long sides overlap with each other when viewed from the vertical scanning direction.

In still another possible feature of the invention, a novel image forming apparatus is provided, which can include any one of the abovementioned document feeding and reading units and a mechanism for forming an image on a recording medium.

These and other features and advantages of the invention will be more clearly seen from the following detailed description of the invention which is provided in connection with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF EXEMPLARY EMBODIMENTS

In the detailed description which follows, specific exemplary embodiments of a document feeding and reading unit and an image forming apparatus therewith are described.

It is understood, however, that the present disclosure is not limited to these embodiments. For example, it is appreciated that the use of the structure, units, and apparatuses disclosed may also be adaptable to any form of imaging systems, such as, for example, not only copying machines but also facsimile apparatuses, multi-functional machines having copy and facsimile capabilities, etc. Other embodiments will be apparent to those skilled in the art upon reading the following description.

Figure 1:
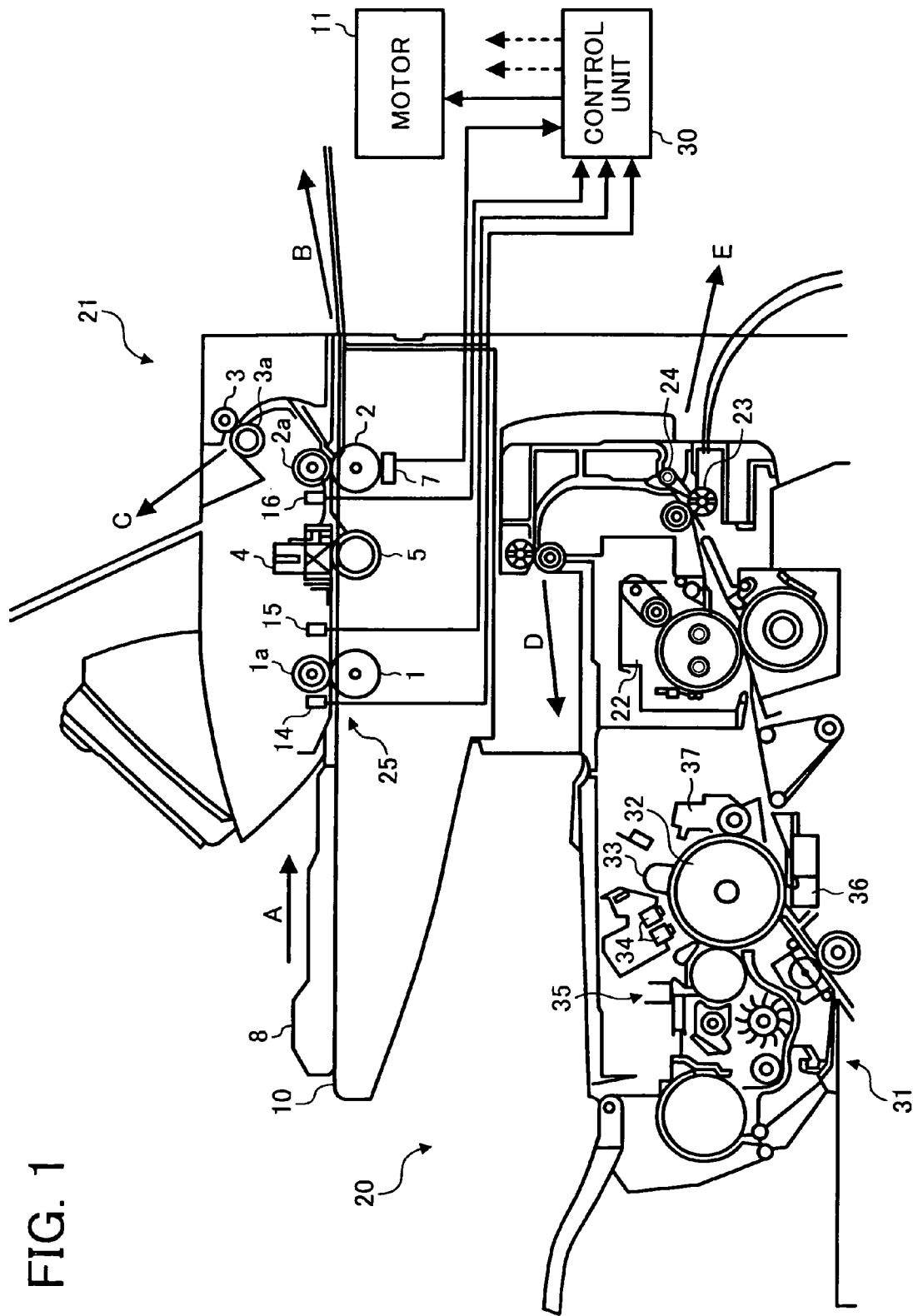
FIG. 1 illustrates the overall structure of an image forming apparatus according to one embodiment disclosed herein.
Figure 2:
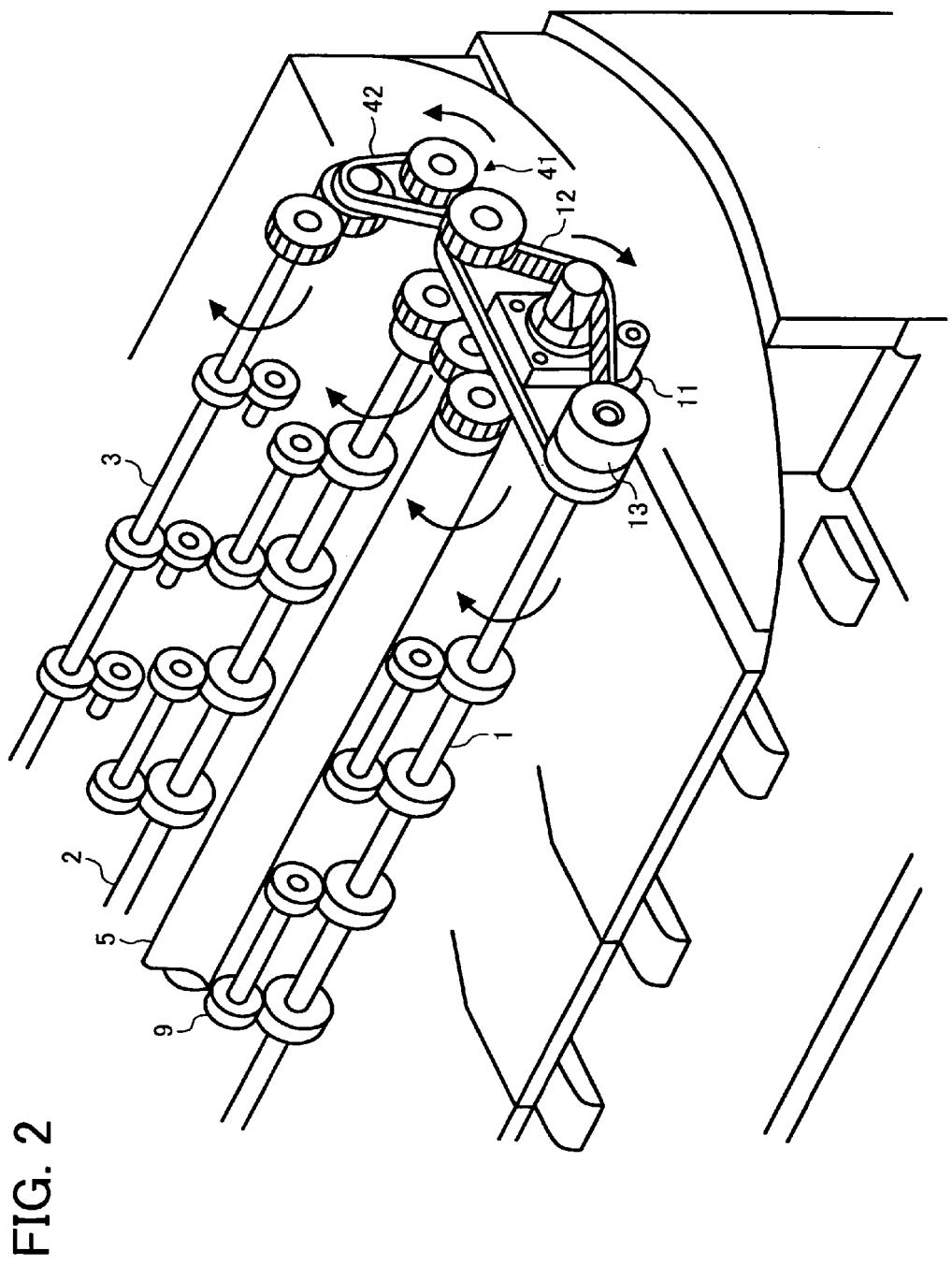
FIG. 2 is a diagrammatic perspective view of a document feeding mechanism included the image forming apparatus of FIG. 1.

A document feeding and reading unit and an image forming apparatus therewith according to one embodiment of the present invention will be described with reference to FIGS. 1 through 4, in which FIG. 1 illustrates the overall structure of the image forming apparatus and FIG. 2 is a diagrammatic perspective view of a document feeding mechanism included therein.

Referring now to FIG. 1, a document feeding and reading unit 21 is provided, which is located on top of an image forming apparatus 20.

The document feeding and reading unit 21 is provided with a document tray 10, side fences 8 for lining up both edges of document sheets, a first sensor 25 for detecting the insertion of documents onto the document tray 10, a second sensor 14 for measuring the length of a document sheet by detecting the leading and tailing edges thereof, a third or registration sensor 15 for detecting the frontal edge of the document sheet and a starting position of document reading, an intake roller 1 and an exit roller 2 for use in transporting the document sheet, a light exposure mechanism (not shown) for illuminating the document sheet transported by the intake roller 1 and exit roller 2 to produce light image rays, a focusing lens (not shown) for converging the light image rays reflected from the document sheet illuminated by the light exposure mechanism, a contact image sensor 4 (reading unit) for receiving the light image rays converged by the focusing lens, a feeding gate (not shown) that functions as a selector for the document sheet to be disposed either toward the downstream B or the upward direction C, an upper disposal roller 3 for disposing the document sheet directed to the upward direction C by the feeding gate, and a fourth sensor 16 for detecting the document sheet disposal by sensing the rear end of the document sheet.

A fixing unit 22 is provided, which is located below the document feeding and reading unit 21. Copy sheets (recording media) are disposed through a sheet disposal roller 23 located downstream of the fixing unit 22 and are then forwarded in an either backward E or forward direction D after the section by a sheet feeding gate 24.

An image forming device 31 is provided upstream of the fixing unit 22, which is configured to form images on copy sheets.

The image forming device 31 is provided at least with a photoreceptor drum 32, a charging unit 33 for charging the photoreceptor drum 32, a light irradiation unit 34 for generating image signals and forming electrostatic latent images on the photoreceptor drum 32 corresponding to the light image rays previously formed, a developing unit 35 for developing the latent images into visible images by processing with toners, a transfer unit 36 for transferring the visible toner images to a copy sheet, and a cleaning unit 37 for removing residual toner particles remaining on the photoreceptor drum 32 after the image transfer.

The toner images thus formed by the image forming device 31 on the copy sheet are subsequently fixed by a fixing unit 22 through heating and pressurization.

Upon inserting a document sheet face up from the direction A represented in FIG. 1, the document feeding and reading unit 21 is configured to detect the document sheet by the first sensor (document insertion sensor) 25.

Subsequently, the document feeding and reading unit 21 functions to instruct a control unit 30 to rotate a drive motor 11 of a stepping motor upon detecting the document sheet by the document insertion sensor 25, and the document sheet is transported by the intake roller 1 to the location between the contact line image sensor (CIS) 4 and a white roller 5.

The surface of the thus transported document sheet is read by the contact line image sensor 4 and images read out are subjected to continuous processing, while the document sheet is further advanced. The document sheet forwarded by the exit roller 2 is then disposed either toward the downstream B or the upward direction C by the feeding gate.

Referring to FIG. 2, the driving force used in transporting the document sheet is carried out by being transmitted from the driver motor 11 by way of a timing belt 12 and a conveying clutch 13 to the intake roller 1 and exit roller 2, as further driver rollers.

In addition, the driving by the timing belt 12 is further transmitted to the upper disposal roller 3 by way of a gear 41 and a timing belt 42.

The intake roller 1 and exit roller 2 can each be formed as rubber rollers that include core metal bars provided therearound with rubber dumplings.

The document feeding and reading unit 21 including these rollers is generally located in the upper portion of the image forming apparatus 20 for the sake of the copying operation, and it is heated through copy operations including from the fixing unit 22.

In the present embodiment of the invention, a contact temperature sensor 7 is provided in the middle portion of the exit roller 2, which is the location closest to the fixing unit 22, as a principal heat source, among the rollers included the unit 21.

In addition, the contact temperature sensor 7 is disposed, being slidably pressed against the outer periphery of the rubber roller portion of exit roller 2 by an elastic member, such as a leaf spring or other similar members, which will be described later on. As a result, the rotatory driving of the exit roller 2 is achieved.

Figures 3, 4:
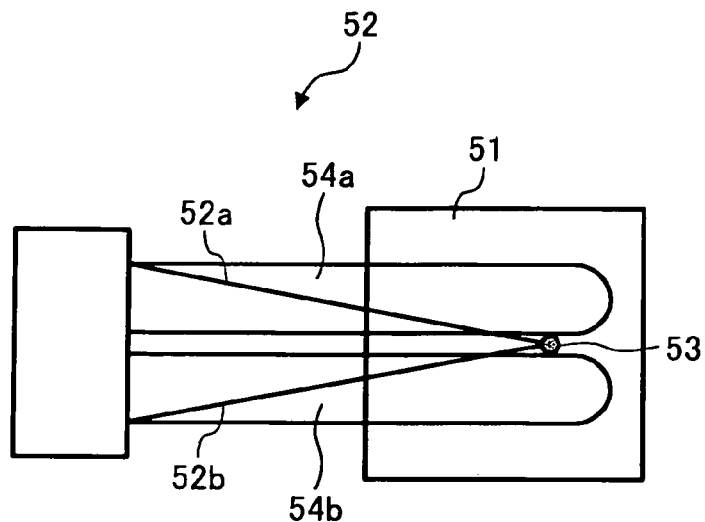
FIG. 3 is a schematic view of a contact temperature sensor including a thermocouple according to one embodiment disclosed herein.
FIG. 4 includes a table illustrating the relationship between the number of rotation of a driver motor and the temperature measured by a contact temperature sensor.

As illustrated in FIG. 3, the contact temperature sensor 7 includes a thermocouple 52 coated therearound with fluorocarbon resin, in which a temperature sensing portion 53 is formed by welding a pair of constituent wires 52a, 52b at their tips. The sensing portion 53 is then brought into contact with the exit roller 2 having a film 51 of fluorocarbon resin interposed therebetween.

The constituent wires 52a, 52b are supported by leaf springs 54a, 54b, respectively, so that the contact temperature sensor 7 can be slidably pressed against the outer periphery of the rubber roller portion of exit roller 2 by a spring force applied by the leaf springs.

The intake roller 1, exit roller 2, and upper disposal roller 3 are pressed against driven rollers 1a, 2a, and 3a, respectively, thereby constituting a transporting mechanism.

The control unit 30 includes a computer having at least a CPU (central processing unit), ROM (read only memory), and RAM (random access memory), which are configured to control a rotation speed of the driver motor 11 upon detecting a temperature of the exit roller 2 by contact temperature sensor 7, according to information output from the temperature detection.

Specifically, the relationship between the rotation speed of the driver motor 11 and the temperature measured by the contact temperature sensor 7 that has been obtained as shown in the table included in FIG. 4 according to the present embodiment can be utilized. This relationship is stored in RAM to be utilized for controlling the rotation speed of the driver motor 11.

Namely, based on temperature information acquired by the contact temperature sensor 7, the CPU is configured to read out a corresponding rotation number per unit time (sec) from the table, which is utilized for controlling the rotation speed of a stepping motor 11, as the driver motor.

Alternatively, the abovementioned operations of controlling the rotation speed may also be performed by storing the relation in RAM as a correlation curve (or correction curve) in place of reading out from the table and then by referring to the RAM data.

In this case, the control of the rotation speed may be carried out with a higher precision after properly interpolating the data stored in RAM. In addition, magnification correction in the vertical scanning direction becomes feasible by additionally adopting the SP (standard play) mode operation.

In addition, the intake roller 1, exit roller 2, and upper disposal roller 3 can be provided in the present embodiment such that the circumferential velocity increases from the roller 1 to the roller 2, and further to the roller 3. As a result, bending during document transport can be prevented.

Furthermore, by adjusting a force applied to the driven rollers 2a, which is pressed against exit roller 2, to be larger than that to the driven roller 3a pressed against upper disposal roller 3, a document transport power by the exit roller 2 is made larger than the upper disposal roller 3.

Therefore, the document feeding and reading unit 21 is configured to detect the leading edge of document sheet by the document insertion sensor 25 upon loading the document onto the document tray 10, and the control unit 30 acquires the temperature at the exit roller 2 measured by contact temperature sensor 7.

The control unit 30 is configured to set a proper rotation number per unit time (sec) for the stepping motor 11 based on the temperature information acquired by the contact temperature sensor 7 and to activate the rotatory drive of the intake roller 1 and exit roller 2.

For example, the rotation number of the stepping motor 11 is set as 4000 pps at a temperature of 25° C. on the surface of exit roller 2 and maintained as it is up to 37.5° C. While the diameter of exit roller 2 appreciably expands at 37.5° C., the control unit 30 now changes the rotation number to 3999 pps based on the results tabulated earlier, which is smaller than the previous number of 4000 pps, and thereby the rotatory drive of the stepping motor 11 can be sustained, and the proper rotation of the intake roller 1, exit roller 2, and upper disposal roller 3 can be realized accordingly.

At the side of lower temperatures, in contrast, the rotation number of 4000 pps set at 25° C. temperature is maintained down to 12.5° C. Since the diameter of exit roller 2 appreciably contracts at 12.5° C., the control unit 30 changes the rotation number to 4001 pps based on the results tabulated earlier, which is larger than the previous number of 4000 pps, and thereby the rotatory drive of the stepping motor 11 can be sustained, and the proper rotation of the intake roller 1, exit roller 2, and upper disposal roller 3 can be realized accordingly.

In the present embodiment, therefore, the rotation numbers of the stepping motor 11 are suitably set and controlled based on the temperature information acquired by the contact temperature sensor 7, and the rotatory drive of the intake roller 1 and exit roller 2 can properly be carried out. As a result, errors in the magnification copying can be reduced even when a change in the diameter of the exit roller 2 results from heating.

In addition, since the contact temperature sensor 7 is located in contact with the exit roller 2, the effect on the roller diameter from the heat can be detected with relative ease.

Furthermore, the contact temperature sensor 7 is disposed in the vicinity of the exit roller 2, which is the closest location to the fixing unit 22, as a principal heat source according to the present embodiment of the invention, and affected most by temperature variation to result in concomitant diameter change of the exit roller 2. By controlling the rotation number of the stepping motor 11 corresponding to the variation in temperature at the location of the exit roller 2, errors in the magnification copying can further be reduced with a higher accuracy.

As described earlier, the intake roller 1, exit roller 2, and upper disposal roller 3 can each be formed as rubber rollers having relatively large linear thermal expansion coefficients according to the present embodiment.

Even for the document sheet transport mechanism including these rollers, the speed of transport can be controlled with a high precision by suitably controlling the rotation number of the stepping motor 11 corresponding to the temperature information acquired by the contact temperature sensor 7. As a result, errors in the magnification copying can be reduced.

In addition, since inexpensive rubber materials are used for forming the rollers, production costs can be reduced for the document feeding and reading unit 21.

As to the contact temperature sensor 7, the thermocouple 52 can be utilized as described above, which is coated therearound with a layer 51 of fluorocarbon resin and brought into contact with the exit roller 2 having the layer 51 interposed there between. With the present structure of the temperature sensor 7, wear on the thermocouple 52 and exit roller 2 can be prevented.

In place of the contact temperature sensor 7 in the present embodiment, a non-contact type temperature sensor may alternatively be used. In such a case, the variation in temperature and a concomitant change in diameter of the exit roller 2 can also be measured with relative ease, still preventing wear on the exit roller 2 and temperature sensor 7.

A document feeding and reading unit and an image forming apparatus therewith according to another embodiment of the present invention will be described with reference to FIGS. 5 and 6. Like numerals will be used to refer to like elements and the reiteration of description is abbreviated unless relevant herein.

Figure 5:
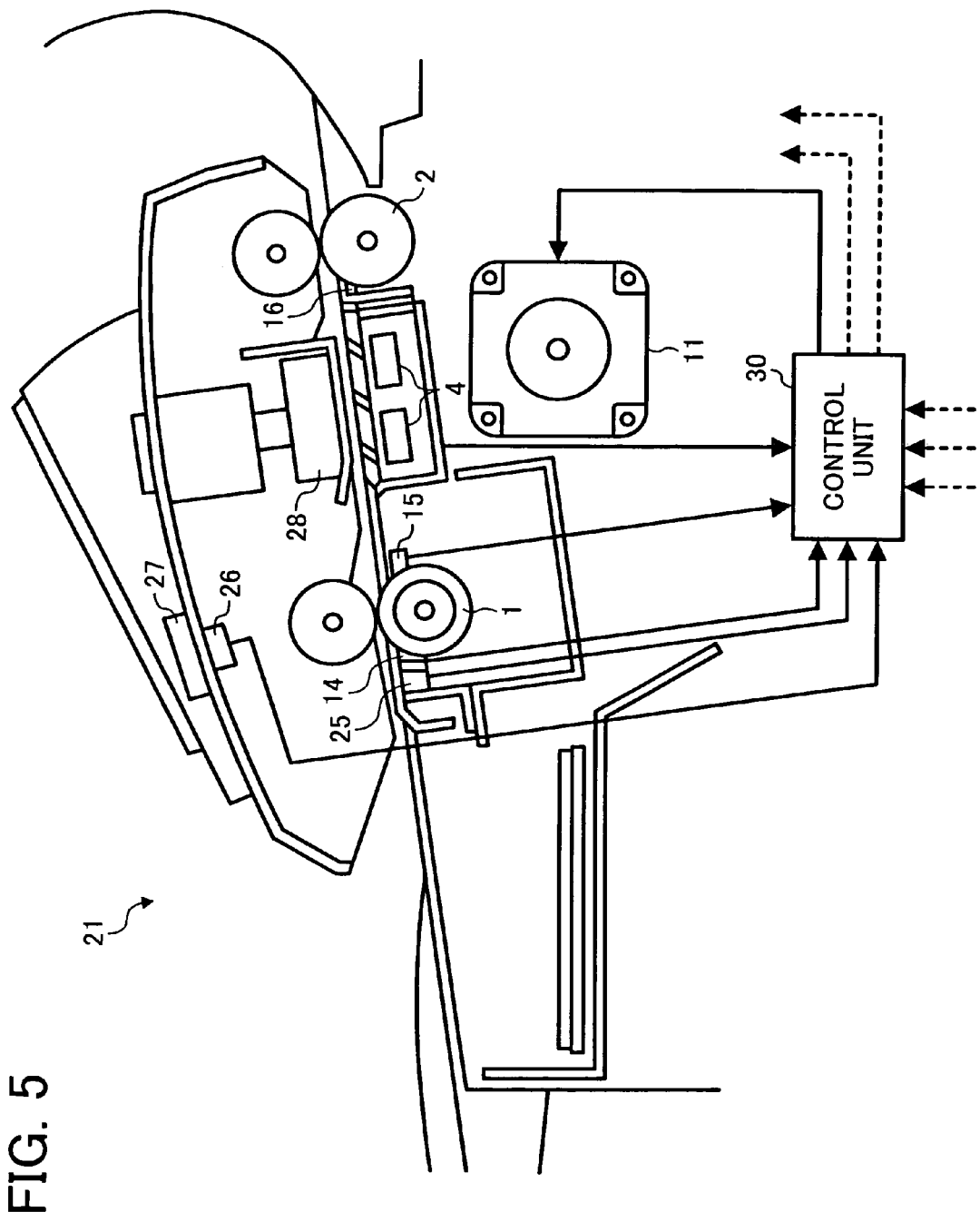
FIG. 5 is a cross sectional view of a document feeding and reading unit provided with a plurality of contact line image sensors according to another embodiment disclosed herein.
Figure 6:
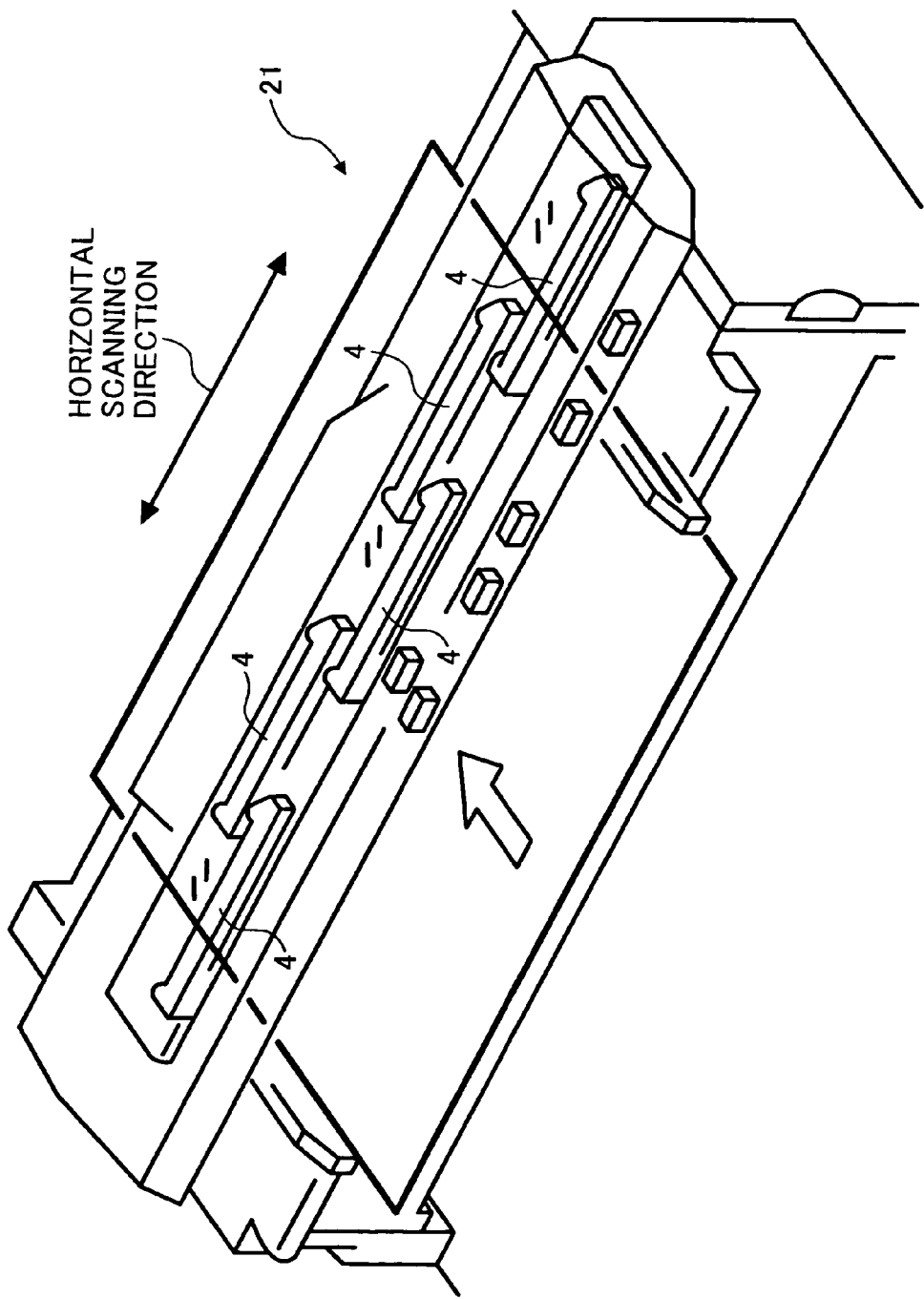
FIG. 6 is a detailed illustration of the plurality of contact line image sensors of FIG. 5.

FIG. 5 is a cross sectional view of a document feeding and reading unit 21 provided with a plurality of contact line image sensors, and FIG. 6 is a detailed perspective view of the portion of the document feeding and reading unit 21, in which the plurality of contact line image sensors are disposed in a zigzag fashion.

The plurality of contact line image sensors 4 are disposed between the intake roller 1 and exit roller 2 in a zigzag fashion, each being separated from neighboring sensors such that the long sides of the plurality of contact line image sensors are each aligned in the horizontal scanning direction and such that the portions of the long sides overlap with each other when viewed from the vertical scanning direction (FIG. 6). As a result, the regions, which are read out by respective line sensors, are also superposed along the horizontal scanning direction.

With the line sensors thus provided, image information is successively read out with the scanning of the document sheet.

The document feeding and reading unit 21 is further provided with an emergency stop button 27 as shown in FIG. 5.

Upon pressing the emergency stop button 27, an emergency stop sensor 26 included also in the unit 21 is configured to sense this operation of pressing the button 27 and subsequently send a corresponding signal to the control unit 30. The control unit 30 in turn instructs to stop the driver motor 11 based on the signal, thereby halting the transport of the document sheet.

In addition, image information of a white guiding plate 28 is provided above the contact line image sensors 4, which is utilized as a white image standard for properly reading the document.

The plurality of contact line image sensors 4 are each aligned in the horizontal scanning direction. Moreover, a first group of the image sensors 4 upstream in the document transport direction, i.e., upstream sensors, and a second group of the image sensors 4, i.e., downstream sensors, are each aligned to be in parallel with each other within a specified range.

An image on a document sheet along the horizontal scanning direction is scanned first by the upstream sensors 4 and then by the downstream sensors 4. The time difference in the thus read images is subsequently subjected to an image processing of correcting the image to be properly aligned and thereby the original document image is recovered.

Also, additional image processing is performed on image joints such that neither a signal overlap nor a gap results between the two sets of images, one read by the upstream sensors and the other by the downstream sensors.

In the following operation after the image correction, abnormal images as a shear in the vertical scanning direction may be generated at the joints. This is caused by the change in document transport speed, which is in turn caused by the thermal expansion of the intake roller 1 and exit roller 2.

This difficulty of abnormal images is obviated in the present invention by performing the following adjustment.

Namely, the document feeding and reading unit 21 according to the present embodiment is configured to perform a proper correction on the document transport speed to be optimum through reliably reflecting a minute change in the diameter of exit roller 2 to the transport speed by using the contact temperature sensor 7 disposed in contact with the surface of exit roller 2, which is located downstream of the document transport.

Therefore, in the document feeding and reading unit 21 according to the present embodiment, even minute effects by changes can reliably be reflected to the document transport by disposing the contact temperature sensor 7 at the location most likely to be affected by the temperature change such as at the exit roller 2.

In addition, in the present document feeding and reading unit 21, the plurality of contact line image sensors 4 are disposed in a zigzag fashion, being separated from neighboring sensors such that their long sides are aligned in the horizontal scanning direction and such that the portions of the neighboring sensors face each other.

As a result, manufacturing costs as well as a machine size of the feeding and reading unit 21 can be reduced compared with a unit incorporating a lengthy integrated reading unit.

It is apparent from the above description, including the examples disclosed, that the document feeding and reading unit and the image forming apparatus therewith disclosed herein have several advantages over those previously known, such as being capable of reducing errors in the magnification copying even when the change in the diameter of drive motors results from heating, among others.

Being provided with advantageous features, the document feeding and reading unit and an image forming apparatus incorporating the unit can suitably be utilized in not only copying machines but also facsimile apparatuses and multifunctional image processing machines having copy and facsimile capabilities.

The process operations set forth in the present description on the document feeding and reading unit and an image forming apparatus incorporating the unit may be implemented using conventional general purpose microprocessors, programmed according to the teachings in the present specification, as will be appreciated to those skilled in the relevant arts. Appropriate software coding can readily be prepared by skilled programmers based on the teachings of the present disclosure, as will also be apparent to those skilled in the relevant arts.

The present specification thus includes also a computer-based product that may be hosted on a storage medium, which includes instructions that can be used to program a microprocessor to perform a process in accordance with the present disclosure. This storage medium can include, but is not limited to, any type of disc including floppy discs, optical discs, CD-ROMs, magneto-optical discs, ROMs, RAMs, EPROMs, EEPROMs, flash memory, magnetic or optical cards, or any type of media suitable for storing electronic instructions.

Obviously, additional modifications and variations of the present invention are possible in light of the above teachings. It is therefore to be understood that within the scope of the appended claims, the present invention may be practiced otherwise than as specifically described herein.

The invention claimed is:

1. A document feeding and reading unit comprising:
   a reading mechanism for reading a document image while transporting a document sheet;
   a fixing unit configured to fix an image on the document sheet;
   at least one transport device including at least one drive roller and driven roller brought into slidable contact with said drive roller, and positioned between said reading mechanism and said fixing unit, and above said fixing unit, and configured to transport said document sheet being read by said reading mechanism while holding said document between said drive roller and said driven roller;
   a detection device configured to measure a temperature at an arbitrary location of said document feeding and reading unit above said fixing unit; and
   a control device configured to control a rotation speed of said drive roller based on temperature information acquired by said temperature detection device,
   wherein said detection device comprises a contact temperature sensor brought into contact with an outer periphery of said drive roller to measure a surface temperature thereof.

2. The document feeding and reading unit according to claim 1, wherein said detection device is disposed in a vicinity of said drive roller.

3. The document feeding and reading unit according to claim 2, wherein said detection device is disposed in a vicinity of the at least one drive roller included in the transport device closest to a heat source.

4. The document feeding and reading unit according to claim 1, wherein said drive roller comprises a rubber roller.

5. The document feeding and reading unit according to claim 4, wherein said reading mechanism comprises a plurality of contact line image sensors disposed in a zigzag fashion, each contact line image sensor being separated from neighboring contact line image sensors such that long sides of said plurality of contact line image sensors are each aligned in a horizontal scanning direction, and such that portions of the long sides overlap with each other when viewed from a vertical scanning direction.

6. A document feeding and reading unit comprising:
means for reading a document image while transporting a document sheet;
means for fixing an image on the document sheet;
at least one means for transporting said document sheet positioned between said means for reading and said means for fixing and above said means for fixing, and including at least one drive roller and driven roller brought into slidable contact with said drive roller, for transporting said document sheet being read by said means for reading while holding said document between said drive roller and said driven roller;
means for measuring a temperature at a location of said document feeding and reading unit above said means for fixing; and
means for controlling a rotation speed of said drive roller based on temperature information acquired by said temperature detection means,
wherein said means for measuring comprises a contact temperature sensor brought into contact with an outer periphery of said drive roller to measure a surface temperature thereof.

7. The document feeding and reading unit according to claim 6, wherein said means for measuring is disposed in a vicinity of said drive roller.

8. The document feeding and reading unit according to claim 7, wherein said means for measuring is disposed in a vicinity of said drive roller included in the means for transporting closest to a heat source.

9. The document feeding and reading unit according to claim 6, wherein said reading means comprises a plurality of contact line image sensors disposed in a zigzag fashion, each contact line image sensor being separated from neighboring contact line image sensors such that long sides of said plurality of contact line image sensors are each aligned in a horizontal scanning direction, and such that portions of the long sides overlap with each other when viewed from a vertical scanning direction.

10. A document feeding and reading unit comprising:
a reading mechanism for reading a document image while transporting a document sheet;
a fixing unit configured to fix an image on the document sheet;
at least one transport device including at least one drive roller and driven roller brought into slidable contact with said drive roller, and positioned between said reading mechanism and said fixing unit, and above said fixing unit, and configured to transport said document sheet being read by said reading mechanism while holding said document between said drive roller and said driven roller;
a detection device configured to measure a temperature at an arbitrary location of said document feeding and reading unit above said fixing unit; and
a control device configured to control a rotation speed of said drive roller based on temperature information acquired by said temperature detection device,
wherein said detection device comprises a non-contact type temperature sensor to measure a surface temperature of said drive roller.

11. The document feeding and reading unit according to claim 10, wherein said detection device is disposed in a vicinity of said drive roller.

12. The document feeding and reading unit according to claim 11, wherein said detection device is disposed in a vicinity of the at least one drive roller included in the transport device closest to a heat source.

13. The document feeding and reading unit according to claim 10, wherein said drive roller comprises a rubber roller.

14. The document feeding and reading unit according to claim 13, wherein said reading mechanism comprises a plurality of contact line image sensors disposed in a zigzag fashion, each contact line image sensor being separated from neighboring contact line image sensors such that long sides of said plurality of contact line image sensors are each aligned in a horizontal scanning direction, and such that portions of the long sides overlap with each other when viewed from a vertical scanning direction.

15. A document feeding and reading unit comprising:
means for reading a document image while transporting a document sheet;
means for fixing an image on the document sheet;
at least one means for transporting said document sheet positioned between said means for reading and said means for fixing and above said means for fixing, and including at least one drive roller and driven roller brought into slidable contact with said drive roller, for transporting said document sheet being read by said means for reading while holding said document between said drive roller and said driven roller;
means for measuring a temperature at a location of said document feeding and reading unit above said means for fixing; and
means for controlling a rotation speed of said drive roller based on temperature information acquired by said temperature detection means,
wherein said means for measuring comprises a non-contact type temperature sensor to measure a surface temperature of said drive roller.

16. The document feeding and reading unit according to claim 15, wherein said means for measuring is disposed in a vicinity of said drive roller.

17. The document feeding and reading unit according to claim 16, wherein said means for measuring is disposed in a vicinity of said drive roller included in the means for transporting closest to a heat source.

18. The document feeding and reading unit according to claim 15, wherein said reading means comprises a plurality of contact line image sensors disposed in a zigzag fashion, each contact line image sensor being separated from neighboring contact line image sensors such that long sides of said plurality of contact line image sensors are each aligned in a horizontal scanning direction, and such that portions of the long sides overlap with each other when viewed from a vertical scanning direction.

* * * * *